United States Patent
Ishiba

(10) Patent No.: US 8,038,091 B2
(45) Date of Patent: Oct. 18, 2011

(54) FAN CONTROL APPARATUS

(75) Inventor: Masatsugu Ishiba, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 831 days.

(21) Appl. No.: 12/078,305

(22) Filed: Mar. 28, 2008

(65) Prior Publication Data

US 2009/0107110 A1   Apr. 30, 2009

(30) Foreign Application Priority Data

Mar. 29, 2007   (JP) ................. P2007-089026

(51) Int. Cl.
*B64D 31/04*   (2006.01)
(52) U.S. Cl. ................. 244/23 A; 244/23 R; 60/233
(58) Field of Classification Search ............ 60/233; 244/12.3, 12.4, 23 R, 23 A, 23 B, 10
See application file for complete search history.

(56) References Cited

U.S. PATENT DOCUMENTS

| | | | | |
|---|---|---|---|---|
| 3,095,165 | A | * | 6/1963 | Rowe ............... 244/12.3 |
| 3,174,284 | A | * | 3/1965 | McCarthy ............ 60/791 |
| 3,381,295 | A | * | 4/1968 | Blackledge ............ 244/186 |
| 3,618,875 | A | * | 11/1971 | Kappus ............ 244/12.3 |
| 5,082,079 | A | | 1/1992 | Lissaman et al. |
| 6,260,796 | B1 | | 7/2001 | Klingensmith |
| 7,188,803 | B2 | | 3/2007 | Ishiba |

FOREIGN PATENT DOCUMENTS

| | | |
|---|---|---|
| JP | 11-255199 | 9/1999 |
| JP | 2006-213168 | 8/2006 |
| JP | 2007-022268 | 2/2007 |
| JP | 2007--55372 | 3/2007 |
| JP | 2007-125976 | 5/2007 |

OTHER PUBLICATIONS

JP2007-022268A Machine translation, Feb. 2007.*
S. Iwase, "Unsteady Flow inside the Single Rotor Blade Row with Multistage Tip Turbine ($2^{nd}$ Report: Effects of bulkheads positioning on efficiency)," vol. 34, No. 2, Mar. 2006.
S. Iwase, et al., "The Fan Driven by High Pressure Tip Turbine," vol. 33, No. 1, Jan. 2005.

* cited by examiner

*Primary Examiner* — Ted Kim
(74) *Attorney, Agent, or Firm* — Finnegan, Henderson, Farabow, Garrett & Dunner, LLP

(57) ABSTRACT

When a FADEC detects an abnormality in any of engine+compressor combinations, a FCC controls the amount of air for driving the fan to a level that is lower than that before the abnormality has been detected, until a state is assumed in which the normally operating engine+compressor combination can supply the air at a flow rate necessary for a fan to generate a propulsion force that has been attained before the abnormality has been detected. As a result, the normally operating engine+compressor combination can be prevented from the occurrence of a surge and a resultant overload state. Therefore, when some drive sources from a plurality of drive sources fail, normally operating drive sources can be prevented from being in an overload state.

9 Claims, 4 Drawing Sheets

FAN CONTROL APPARATUS

BACKGROUND OF THE INVENTION

1. Field of the Invention

The present invention relates to a fan control apparatus, and more particularly to a fan control apparatus that controls a fan that is rotary driven by being supplied with a fluid and serves to generate a propulsion force of a flying object.

2. Description of the Related Art

A propulsion force for causing a VTOL (Vertical Take-off and Landing) apparatus to fly has conventionally been obtained by supplying the air by an bleed gas turbine engine and rotary driving a fan. For example, Japanese Patent Application Laid-open No. 2005-125976 discloses a VTOL apparatus having a transfer system of a high-pressure gas type. With such configuration, a drive source takes in the air from an air suction port and compresses the air with a compressor. The compressed high-pressure gas is transferred through a pipe and blown onto an input shaft of the fan to rotate the fan. Based on the fail-safe approach, two drive sources of identical configuration are installed at the VTOL apparatus.

However, in such a VTOL apparatus having two engines, one engine sometimes fails and the so-called OEI (One Engine Inoperative) state is assumed. In the case of such OEI, the revolution speed of the normally operating engine and the turbine inlet temperature are increased over those of the rated output to compensate the insufficient fan drive power. However, immediately after one engine fails, the revolution speed of the normally operating engine is low. As a result, when the required output abruptly increases, a surge or the like occurs, the engine is overloaded, and there is a risk that even the engine that has not failed will not be able to operate normally.

SUMMARY OF THE INVENTION

With the foregoing in view, it is an object of the present invention to provide a fan control apparatus such that when some of a plurality of drive sources fail, the normally operating drive sources are prevented from being overloaded.

The present invention provides a fan control apparatus comprising: a fan that is rotary driven by being supplied with a fluid and generates a propulsion force of a flying object; two or more fluid supply units that supply the fluid to the fan; an abnormality detection unit that detects abnormalities in the fluid supply units; and a control unit that controls a control variable relating to flight of the flying object, wherein when the abnormality detection unit detects an abnormality in any of the fluid supply units, the control unit controls the control variable relating to the flight of the flying object to be lower than that established before the abnormality detection unit has detected the abnormality, the control being continued until a state is assumed in which the fluid supply unit, for which the abnormality detection unit has not detected an abnormality, can supply the fluid at a flow rate necessary for the fan to generate a propulsion force that has been attained before the abnormality detection unit has detected the abnormality.

With such configuration, when the abnormality detection unit detects an abnormality in any of the fluid supply units, the control unit controls the control variable relating to the flight of the flying object so that a control variable is obtained that is lower than that before the abnormality has been detected until a state is assumed in which the normally operating fluid supply unit can supply the fluid at a flow rate necessary for the fan to generate a propulsion force that has been attained before the abnormality has been detected. Thus, with such configuration, the control variable relating to the flight of the flying object is decreased to a level attained before the abnormality has been detected until the normally operating fluid supply unit is fully up. As a result, the normally operating fluid supply unit can be prevented from the occurrence of a surge, or the like, and an overload state.

In this case, the control variable relating to the flight of the flying object can be a flow rate of the fluid supplied to the fan.

Where the flow rate of the fluid supplied to the fan is high when a fluid supply unit fails, an overload easily occurs in the normally operating fluid supply unit, but with the above-described configuration, the flow rate of the fluid supplied to the fan is decreased with respect to that before the abnormality has been detected until a state is assumed in which the normally operating fluid supply unit can supply the fluid at a flow rate necessary for the fan to generate a propulsion force that has been attained before the abnormality has been detected. Therefore, the normally operating fluid supply unit can be prevented from the occurrence of a surge, or the like, and an overload state.

In this case, it is preferred that the fan control apparatus further comprise a fluid path, which is connected between the fluid supply unit and the fan, and through which the fluid can flow and that the control unit control the flow rate of the fluid that can flow in the fluid path.

With such configuration, the control unit controls the flow rate of the fluid that can flow in the fluid path connected between the fluid supply unit and the fan. Therefore, the flow rate of the fluid supplied to the fan can be controlled without changing, for example, the output of the fluid supply unit and the load on the fluid supply unit can be reduced.

On the other hand, when the abnormality detection unit detects an abnormality in any of the fluid supply units, the control unit preferably controls the control variable relating to the flight of the flying object by a control gain that is lower than that established before the abnormality has been detected until a state is assumed in which the fluid supply unit in which the abnormality has not been detected can supply the fluid at a flow rate necessary for the fan to generate a propulsion force that has been attained before the abnormality has been detected.

With such configuration, when the abnormality detection unit detects an abnormality in any of the fluid supply units, the control unit controls the control variable relating to the flight of the flying object by a control gain that is lower than that before the abnormality has been detected until a state is assumed in which the fluid supply unit in which the abnormality has not been detected can supply the fluid at a flow rate necessary for the fan to generate a propulsion force that has been attained before the abnormality has been detected. Therefore, with such configuration, the control variable relating to the flight of the flying object is controlled by a low control gain with gradual control responsiveness until the normally operating control supply unit is fully up. As a result, the normally operating fluid supply unit can be prevented from the occurrence of a surge, or the like, and an overload state.

The fluid can be air, and the fluid supply unit can supply the air to the fan.

Because the fluid supply unit is of an air bleed type in which the air is supplied to the fan, surge, or the like, can easily occur and the engine can be easily overloaded. Therefore, with the above-described configuration, the present invention demonstrates even greater effect.

With the fan control apparatus in accordance with the present invention, when some drive sources from a plurality

DESCRIPTION OF THE PREFERRED EMBODIMENTS

A propulsion fan control apparatus of an embodiment of the present invention will be described below with reference to the appended drawings.

Figure 1:
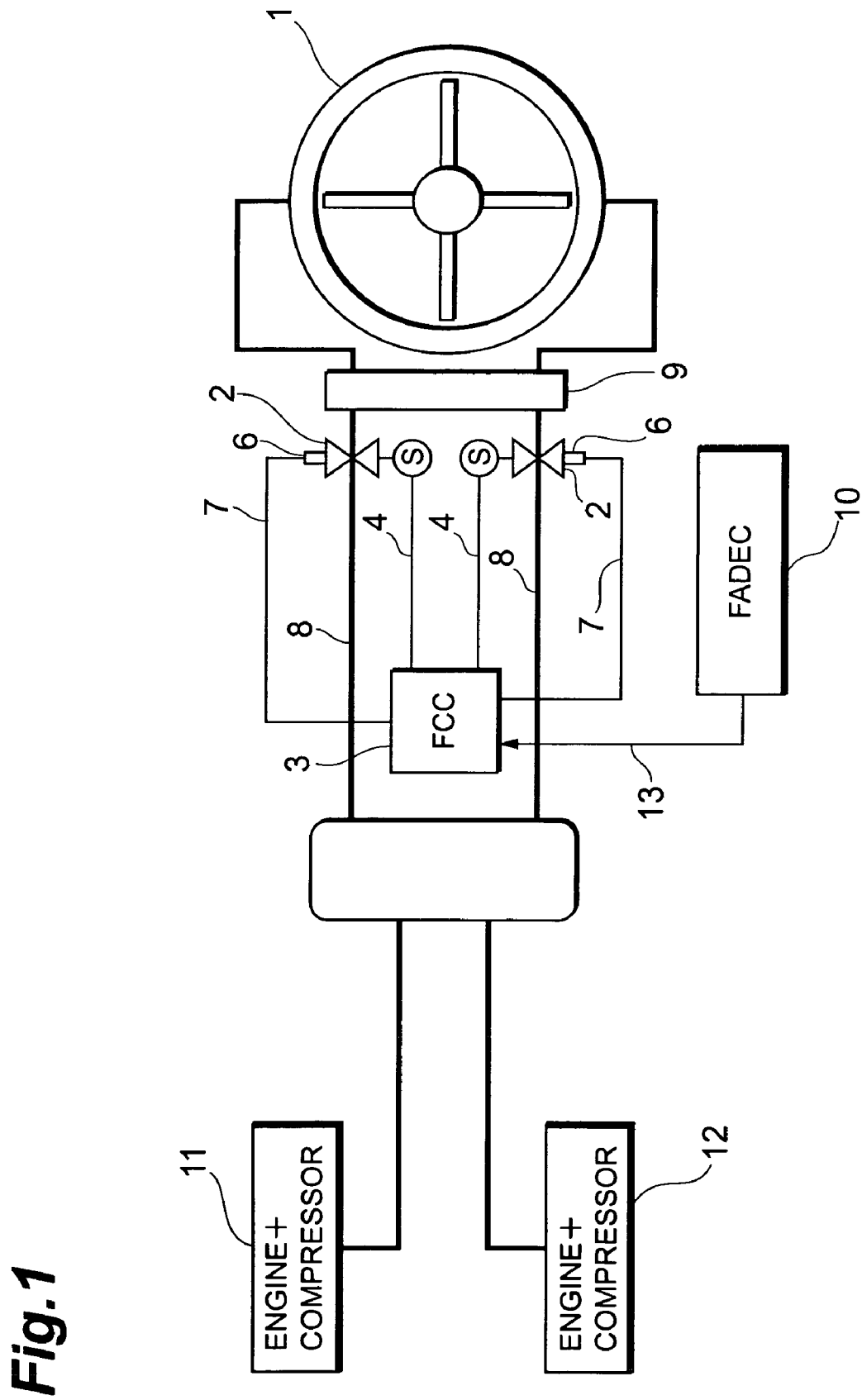
FIG. 1 illustrates the configuration of a propulsion fan control apparatus of an embodiment.

FIG. 1 illustrates the configuration of a propulsion fan control apparatus of an embodiment. As shown in FIG. 1, the propulsion fan control apparatus of the present embodiment serves to control the operation of a fan that generates a propulsion force of a VTOL apparatus and comprises a fan 1, flow rate control valves 2, an FCC 3, opening degree sensors 6, air supply systems 8, a collector pipe 9, an FADEC 10, and engine+compressor combinations 11, 12.

The engine+compressor combinations 11, 12 serve to supply the compressed air as a drive source to the fan 1 and are composed of an air source bleed gas turbine engine and a compressor. A reciprocal engine, a rotary engine, or an electric motor also can be employed as a power source for driving the compressor. The engine+compressor combinations 11, 12 function as fluid supply units set forth in the claims.

Two air supply systems 8 serve to supply the compressed are from the engine+compressor combinations 11, 12 to the fan 1. The air supply systems 8 function as fluid paths set forth in the claims. A flow rate control valve 2 is provided in each of the air supply systems 8. The two air supply systems 8 are connected to the collector pipes 9 from the outlets of the flow rate control valves 2. The outlet of the collector pipe 9 is connected by a pipe to the fan 1.

Each flow rate control valve 2 has a capacity that is adapted for the case in which an abnormality occurs in one air supply system 8 and the necessary variable of air is supplied to the fan 1 by only one system. The flow rate control valve 2 may use an electric drive or a hydraulic drive. The flow rate control valves 2 are connected to the FCC (Flight Control Computer) 3 by a communication means such as an electric cable and is controlled by a valve opening degree control signal 4 from the FCC 3.

An opening degree sensor 6 that detects the opening degree of the valve is connected to each flow rate control valve 2. The opening degree sensor 6 is connected to the FCC 3 by a communication means such as an electric cable, and an opening degree sensor signal 7 of the opening degree sensor 6 is sent to the FCC 3. The FCC serves to control the flight of the VTOL apparatus and functions as a control unit set forth in the claims.

The FADEC (Full Authority Digital Engine Control) 10 serves to detect abnormalities in the engine+compressor combinations 11, 12. The FADEC 10 functions as an abnormality detection unit set forth in the claims. The FADEC 10 and FCC 3 are connected to each other by a communication means such as an electric cable, and an engine operation state parameter signal 13 is sent from the FADEC 10 to the FCC 3.

Figure 2:
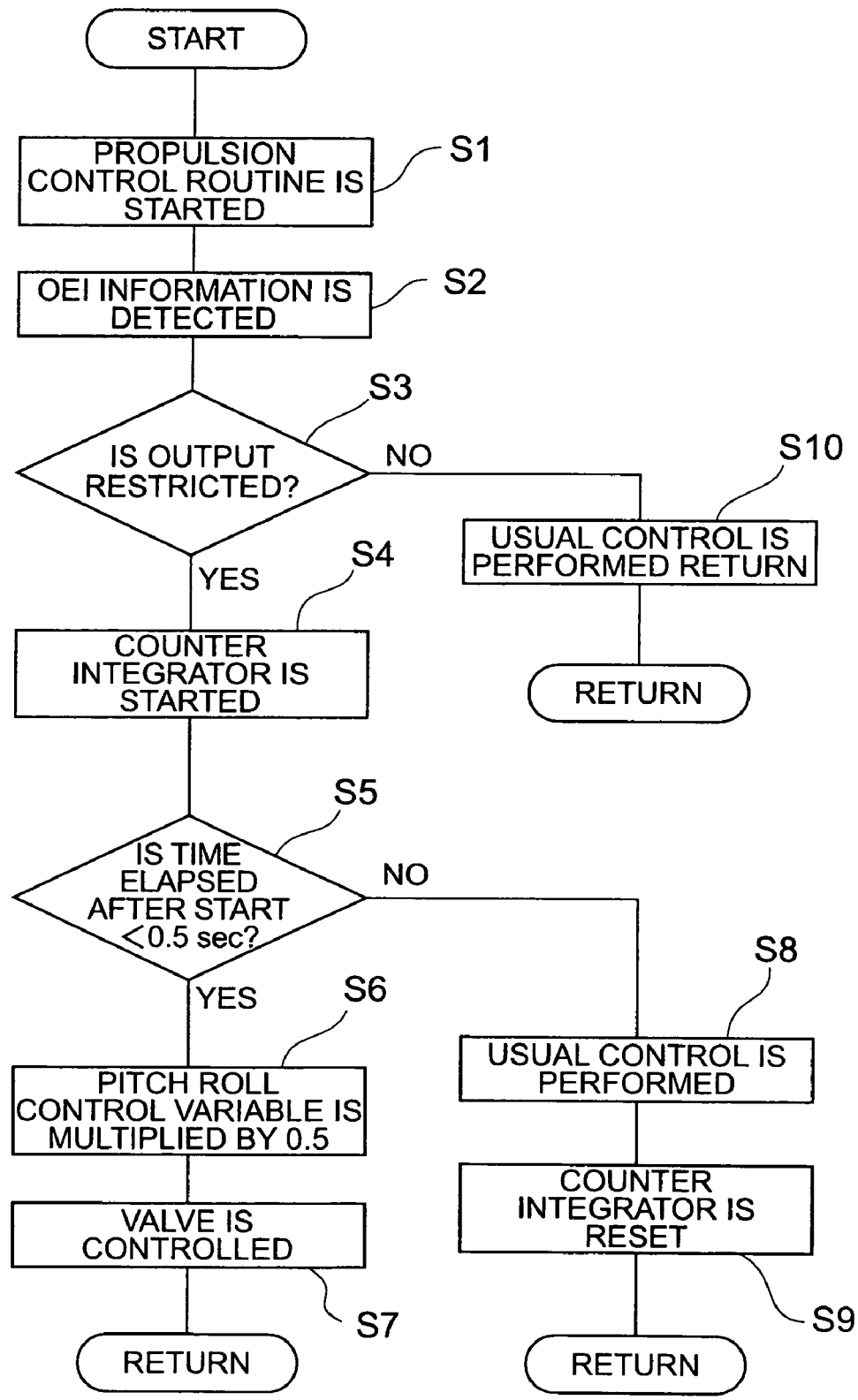
FIG. 2 is a flowchart illustrating the operation of the propulsion fan control apparatus of an embodiment.
Figure 3:
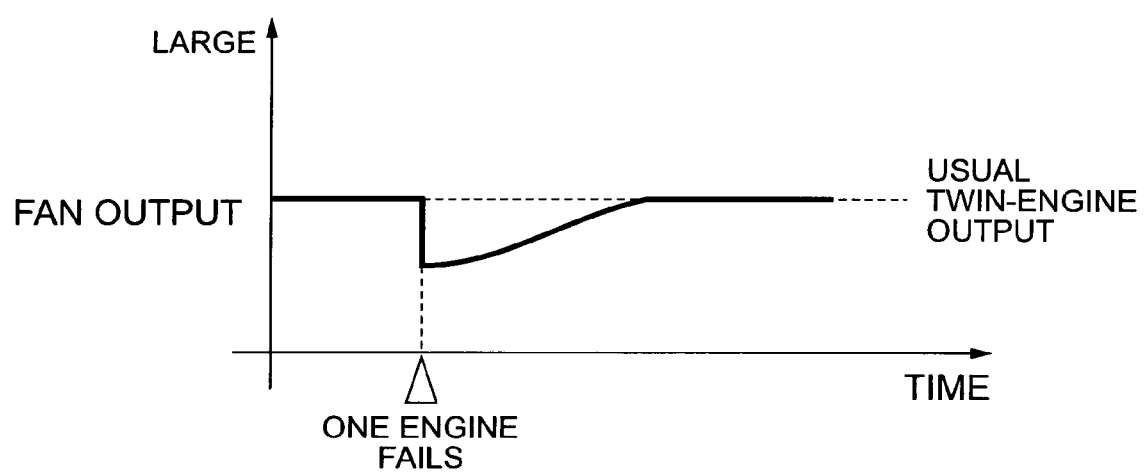
FIG. 3 is a graph illustrating the variation of fan output during OEI.
Figure 4:
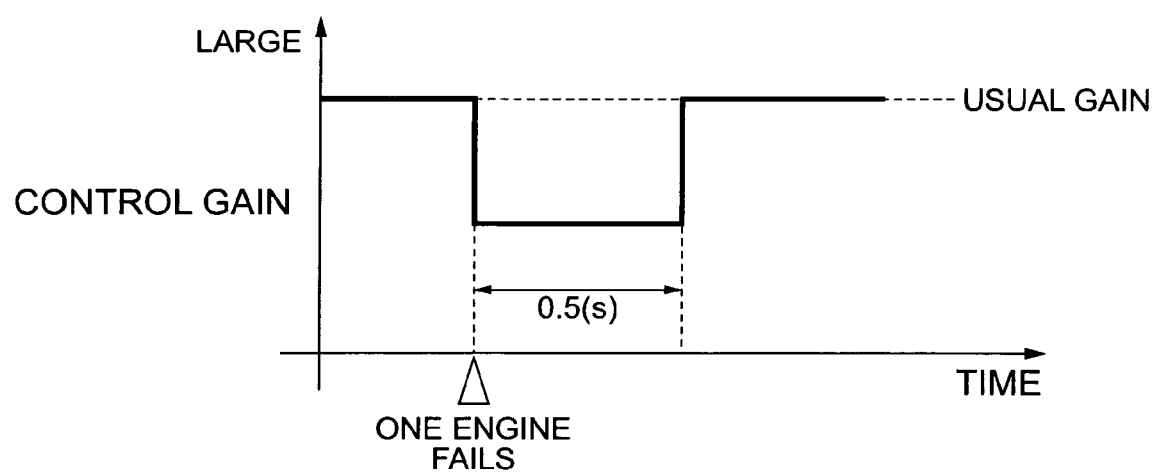
FIG. 4 is a graph illustrating the variation of control gain of fan control during OEI.

The operation of the propulsion fan control device of the present embodiment will be described below. FIG. 2 is a flowchart illustrating the operation of the propulsion fan control apparatus of the embodiment. As shown in FIG. 2, where a propulsion control routine is started in the flight of the VTOL apparatus (S1), an abnormality of the engine+compressor combinations 11, 12 is detected by the FADEC 10, and an engine operation state parameter signal 13 is sent to the FCC 3 (S2).

Where an abnormality occurs in one of engine+compressor combinations 11, 12 and the output of the fan 1 is restricted (S3), a counter integrator (timer) located in the FCC 3 is started (S4). Where the time that has elapsed from the counting start of the counter integrator is less than 0.5 sec (S5), the control variable relating to pitch and roll of the VTOL apparatus is set to the control variable in the usual control that is multiplied by a factor of 0.5 (S6), and the output (amount of air required for the fan 1) of the fan 1 is decreased with respect to that before an OEI has occurred, as shown in FIG. 3. Further, as shown in FIG. 4, the control gain is set to the usual control gain multiplied by a factor of 0.5. The FCC 3 sends to the flow rate control valve 2 the valve opening degree control signal 4 corresponding to the control gain that was set to obtain the set control variable, and the flow rate control valve 2 is controlled (S7).

Where the time that has elapsed from the counting start of the counter integrator is equal to or more than 0.5 sec (S5), the control variable relating to pitch and rolls of the VTOL apparatus and the output (amount of air required for the fan 1) of the fan 1 are set to the control variables during usual control, as shown in FIG. 3 (S8). As shown in FIG. 4, the control gain is set to the usual value. The counter integrator located in the FCC 3 is reset (S9).

On the other hand, where both engine+compressor combinations 11, 12 operate normally and the output of the fan 1 is not limited (S3), the FCC 3 performs the usual control (S10).

Where an OEI state has been assumed in the conventional VTOL apparatus carrying two bleed-type gas turbine engines, the restriction of engine output for 0.5 sec according to the request from the gas turbine engine is a condition for establishing a combustion cycle of the gas turbine engine. In this case, the amount of air supplied to the fan 1 driven by the air obtained by engine bleed must be reduced by 20%. Where such condition is not met, a surge is caused in the gas turbine engine by the bleed of air for driving the fan 1 and the engine stops.

The conventional system for propulsion fan control has been created based on optimization by a control gain and control variable during the usual fan drive by assuming that twin engines operate normally. However, when one of the twin engines fails, the amount of air bleeded before the fan drive output is raised by a normally operating engine to a level attained with the twin-engine configuration is restricted. Where the control gain corresponding to the normal engine operation is directly used in this interval, the gain becomes inadequate, fuselage divergence occurs, and the flight is impossible. Further, in adaptive control based on the gain during output restrictions, satisfactory flight performance (stability) cannot be obtained.

Accordingly, in the present embodiment, when the FADEC 10 detects an abnormality of any of engine+compressor combinations 11, 12, the FCC 3 controls the control variable relating to the flight of the VTOL apparatus, that is, the amount of air for driving the fan, so that an amount is obtained that is lower than that before the abnormality has been detected until a state is assumed in which the normally operating combination from among the engine+compressor combinations 11, 12, can supply the air at a flow rate necessary for the fan 1 to generate a propulsion force that has been attained before the abnormality has been detected. Thus, with such configuration, the control variable relating to the flight of the VTOL apparatus is decreased with respect to that before the abnormality has been detected until the normally operating combination from among the engine+compressor combinations 11, 12 is fully established. During this, the control gain related to the pitch control variable is decreased with respect to that before the abnormality has been detected. As a result, the normally operating engine+compressor combination 11, 12 can be prevented from the occurrence of a surge and an overload state. Thus, by restricting the amount of air for driving the fan, it is possible to adapt to the engine output restrictions that satisfy the engine operation conditions and satisfy the condition at which the combustion cycle of the gas turbine engine is established. Therefore, by switching the attitude control gain, it is possible to satisfy the engine operation conditions and prevent the fuselage divergence.

In particular, in the present embodiment, because the FCC 3 controls, by the flow rate control valves 2, the flow rate of the air that can flow through an air supply system 8 connecting the engine+compressor combinations 11, 12 and the fan 1 with the flow rate control valves, the flow rate of the fluid supplied to the fan 1 can be controlled without changing the output, or the like, of the engine+compressor combinations 11, 12, and the load of the engine+compressor combinations 11, 12 can be reduced.

An embodiment of the present invention is described above, but the present invention is not limited to the above-described embodiment and can be changed in a variety of ways. For example, in the above-described embodiment, an aspect is mainly explained in which an air flow rate required for the fan 1 is taken as a control variable when an abnormality occurs in one of the engine+compressor combinations 11, 12 and the air flow rate is made less than the usual one until the normally operating combination, from among the engine+compressor combinations 11, 12, is fully up. However, the present invention is not limited to such configuration. For example, when an abnormality occurs in one of the engine+compressor combinations 11, 12, a control gain relating to flight control or attitude control computed by the FCC 3 can be reduced with respect to that before the abnormality has been detected until the normally operating combination from among the engine+compressor combinations 11, 12 is fully up.

What is claimed is:

1. A fan control apparatus comprising:
   a fan that is rotary driven by being supplied with a fluid and generates a propulsion force of a flying object;
   two or more fluid supply units that supply the fluid to the fan;
   an abnormality detection unit that detects abnormalities in the fluid supply units; and
   a control unit that controls a control variable relating to flight of the flying object, wherein
   when the abnormality detection unit detects an abnormality in any of the fluid supply units, the control unit determines whether a predetermined time has elapsed since the abnormality was detected, and if the control unit determines that the predetermined time has not elapsed, the control unit controls, by a control gain, the control variable relating to the flight of the flying object to be lower than that established before the abnormality detection unit has detected the abnormality, the control being continued until a state is assumed in which the fluid supply unit, for which the abnormality detection unit has not detected an abnormality, can supply the fluid at a flow rate necessary for the fan to generate a propulsion force that has been attained before the abnormality detection unit has detected the abnormality, and
   wherein the control gain is lower than that established before the abnormality detection unit has detected the abnormality.

2. The fan control apparatus according to claim 1, wherein the control variable relating to the flight of the flying object is a flow rate of the fluid supplied to the fan.

3. The fan control apparatus according to claim 2, further comprising a fluid path which is connected between the fluid supply unit and the fan, and through which the fluid can flow, wherein
   the control unit controls the flow rate of the fluid that can flow in the fluid path.

4. The fan control apparatus according to claim 1, wherein the fluid is air, and the fluid supply unit supplies the air to the fan.

5. The fan control apparatus according to claim 1, wherein if the control unit determines that the predetermined time has elapsed after the abnormality was detected, the control unit controls the control variable relating to the flight of the flying object to be equal to that established before the abnormality detection unit detected the abnormality.

6. The fan control apparatus according to claim 1, wherein if the control unit determines that the predetermined time has elapsed after the abnormality was detected, the control unit controls the control variable relating to the flight of the flying object by a control gain equal to that established before the abnormality detection unit detected the abnormality.

7. The fan control apparatus according to claim 1, wherein the predetermined time is 0.5 seconds.

8. The fan control apparatus according to claim 1, wherein the control unit includes a timer, wherein the timer is reset if the predetermined time has elapsed since the abnormality was detected.

9. The fan control apparatus according to claim 1, wherein the control unit communicates with control valves so that the valves open to a degree corresponding to the control gain.

* * * * *